Patented Mar. 9, 1926.

1,575,762

UNITED STATES PATENT OFFICE.

CHARLES HOFFMAN, OF TUCKAHOE, NEW YORK, AND CHARLES N. FREY, OF WARREN, OHIO, ASSIGNORS, BY MESNE ASSIGNMENTS, TO THE FLEISCHMANN COMPANY, OF NEW YORK, N. Y.

PREPARING YEAST FOR USE IN FOOD PRODUCTS.

No Drawing. Application filed September 15, 1923. Serial No. 662,989.

*To all whom it may concern:*

Be it known that we, CHARLES HOFFMAN, a citizen of the United States, residing at Tuckahoe, Westchester County, New York State, and CHARLES N. FREY, a citizen of the United States, residing at Warren, Trumbull County, State of Ohio, have invented certain new and useful Improvements in Preparing Yeast for Use in Food Products; and we do hereby declare the following to be a full, clear, and exact description of the invention such as will enable others skilled in the art to which it appertains to make and use the same.

In the co-pending application of Charles Hoffman, Serial No. 662,988 filed September 15, 1923 there is described an improved bread wherein the vitamin-B deficiency is supplied and the nutritive value of the bread otherwise improved by the addition of yeast other than that employed for leavening the bread. As pointed out in that application, in order for yeast to be suitable for this use it must have its cell walls unruptured and must also be inactive in so far as the fermentation and maturing effects on the gluten of the dough are concerned.

The invention of the present case relates to method of producing a yeast preparation having the above-mentioned qualities and otherwise suitable for use in bread for its nutritive value and its high vitamin content, and the object of the invention is to provide a process whereby a yeast preparation having such qualities may be produced in a simple, efficient and economical manner.

The invention of this application also includes the yeast preparation itself as a food product for direct consumption or for use in bread or other foods.

The activity of the yeast cells may be destroyed by the application of sufficient heat in drying, the degree of heat necessary to quickly dry the yeast and destroy its activity being insufficient to materially impair the vitamin-B content. Such rapid drying, however, is liable to rupture the wall of the yeast cell unless carried out under sub-atmospheric pressure. We therefore preferably dry the yeast in a vacuum drum drier such as largely employed for the production of milk powder. In such an apparatus the moisture in the yeast cell is largely withdrawn by suction, so that the application of heat does not vaporize the remaining moisture in the yeast cell in such manner as to explode the cell.

We prefer, however, to pre-treat the yeast before drying in order to prevent the escape of any portion of the cell content through the pores of the walls of the cell even when the latter are unruptured. The least dried without pre-treatment will, when dissolved in liquid in the mixing of the bread, allow the escape of some of the nitrogenous matter, particularly the amino acids which in quantities desired in bread manufacture impart a bitter taste and discoloration of the bread, and also certain of the enzyme ingredients of the yeast cell may escape which may adversely affect the fermentation of the dough. We have found, however, that the dried yeast product produced by the vacuum drum drying process as above described can be materially improved by treating the yeast in such manner as to coagulate the protoplasmic material within the yeast cell, such coagulation serving to substantially prevent the escape of any part of the yeast cell content when dissolved in water or added to bread.

One method of so treating the yeast prior to drying is to add to it a saturated solution of ammonium sulfate, a quantity of such solution of from one-half to full weight of the yeast (weighed as ordinary commercial compressed yeast) being used. The yeast and ammonium sulfate mixture is heated to approximately 85° C. and is then filtered and dried as above described, at least a portion of the ammonium sulphate being washed out prior to drying, if desired.

In lieu of using the saturated solution of ammonium sulfate as above described, a dilute acid such as phosphoric, acetic, or citric, may be used. Very good results have been produced by using the above acids diluted to 5% concentration, the amount of the diluted acid being about equal to the weight of the yeast to be treated. Sulfuric acid may also be employed in the same way, preferably a 1 or 2% acid being employed. The solution is heated as above described and the material filtered and dried.

The acid-treated yeast is not quite so suitable for the manufacture of bread as the yeast treated with ammonium sulfate. The acid-treated yeast cannot be mixed with the dough while dry without producing discoloration and noticeable flavor and odor. If used wet, the acid-treated yeast will produce a fair quality of bread without noticeable flavor or odor of the yeast. The ammonium sulfate-treated yeast may be used dried or wet and does not affect the color or flavor of the bread.

When the above-described pre-treatment is employed, the step of heating with the acid or sulfate substantially destroys the life of the yeast plant so that the yeast may be dried at low temperatures in open trays if desired. We prefer, however, to drum-dry the yeast in any case, as it is easier to prevent contamination of the yeast during the drying process, and is in most circumstances a more economical process, due to the large area required for tray-drying on a large scale.

Having described our invention, what we claim as new and desire to secure by Letters Patent, is:—

1. The process of treating yeast which consists in devitalizing the yeast and drying without rupturing the cell walls.

2. The process of treating yeast which consists in coagulating the protoplasmic material of the yeast cells, devitalizing the yeast and drying without rupturing the cell walls.

3. A process of treating yeast which consists in subjecting the yeast to the action of a substance adapted to coagulate the protoplasmic material, heating to divitalize the yeast, and drying without rupturing the cell walls.

4. A process of treating yeast which consists in subjecting the yeast to the action of a salt adapted to coagulate the protoplasmic material, heating to devitalize the yeast, and drying without rupturing the cell walls.

5. The process of treating yeast which consists in subjecting the yeast to the action of an ammonium salt and devitalizing and drying without rupturing the cell walls.

6. The process of treating yeast which consists in subjecting the yeast to the action of ammonium sulfate and devitalizing and drying without rupturing the cell walls.

7. The step in the process of treating yeast which consists in treating the yeast with a saturated solution of ammonium sulfate, heating the solution to substantially 85° C. and then filtering and drying.

8. The steps in the process of treating yeast which consist in treating the yeast with a saturated solution of ammonium sulphate, heating to substantially 85° C., removing at least a portion of the ammonium sulphate by washing, and then filtering and drying without rupturing the cell walls.

9. The steps in the process of treating yeast which consist in treating the yeast with ammonium sulphate and heating to devitalize the yeast without rupturing the cell walls.

10. As a food product, a devitalized dried yeast with the walls of the yeast cells substantially unruptured.

11. As a food product, a devitalized dried yeast with the walls of the yeast cells substantially unruptured, and with the protoplasmic material in the cells coagulated.

12. As an improved product, a devitalized yeast, with the walls of the yeast cells substantially unruptured and with the protoplasmic material in the cells coagulated, which is admixed with ammonium sulphate.

In testimony whereof we affix our signatures.

CHARLES HOFFMAN.
CHARLES N. FREY.

yeast treated with ammonium sulfate. The acid-treated yeast cannot be mixed with the dough while dry without producing discoloration and noticeable flavor and odor. If used wet, the acid-treated yeast will produce a fair quality of bread without noticeable flavor or odor of the yeast. The ammonium sulfate-treated yeast may be used dried or wet and does not affect the color or flavor of the bread.

When the above-described pre-treatment is employed, the step of heating with the acid or sulfate substantially destroys the life of the yeast plant so that the yeast may be dried at low temperatures in open trays if desired. We prefer, however, to drum-dry the yeast in any case, as it is easier to prevent contamination of the yeast during the drying process, and is in most circumstances a more economical process, due to the large area required for tray-drying on a large scale.

Having described our invention, what we claim as new and desire to secure by Letters Patent, is:—

1. The process of treating yeast which consists in devitalizing the yeast and drying without rupturing the cell walls.

2. The process of treating yeast which consists in coagulating the protoplasmic material of the yeast cells, devitalizing the yeast and drying without rupturing the cell walls.

3. A process of treating yeast which consists in subjecting the yeast to the action of a substance adapted to coagulate the protoplasmic material, heating to devitalize the yeast, and drying without rupturing the cell walls.

4. A process of treating yeast which consists in subjecting the yeast to the action of a salt adapted to coagulate the protoplasmic material, heating to devitalize the yeast, and drying without rupturing the cell walls.

5. The process of treating yeast which consists in subjecting the yeast to the action of an ammonium salt and devitalizing and drying without rupturing the cell walls.

6. The process of treating yeast which consists in subjecting the yeast to the action of ammonium sulfate and devitalizing and drying without rupturing the cell walls.

7. The step in the process of treating yeast which consists in treating the yeast with a saturated solution of ammonium sulfate, heating the solution to substantially 85° C. and then filtering and drying.

8. The steps in the process of treating yeast which consist in treating the yeast with a saturated solution of ammonium sulphate, heating to substantially 85° C., removing at least a portion of the ammonium sulphate by washing, and then filtering and drying without rupturing the cell walls.

9. The steps in the process of treating yeast which consist in treating the yeast with ammonium sulphate and heating to devitalize the yeast without rupturing the cell walls.

10. As a food product, a devitalized dried yeast with the walls of the yeast cells substantially unruptured.

11. As a food product, a devitalized dried yeast with the walls of the yeast cells substantially unruptured, and with the protoplasmic material in the cells coagulated.

12. As an improved product, a devitalized yeast, with the walls of the yeast cells substantially unruptured and with the protoplasmic material in the cells coagulated, which is admixed with ammonium sulphate.

In testimony whereof we affix our signatures.

CHARLES HOFFMAN.
CHARLES N. FREY.

Certificate of Correction.

It is hereby certified that in Letters Patent No. 1,575,762, granted March 9, 1926, upon the application of Charles Hoffman, of Tuckahoe, New York, and Charles N. Frey, of Warren, Ohio, for an improvement in "Preparing Yeast for Use in Food Products," errors appear in the printed specification requiring correction as follows: Page 1, line 64, for the word "least" read *yeast*, and line 91, after the word "then" insert the word *cooled;* and that the said Letters Patent should be read with these corrections therein that the same may conform to the record of the case in the Patent Office.

Signed and sealed this 13th day of April, A. D. 1926.

[SEAL.]

M. J. MOORE,
*Acting Commissioner of Patents.*

Certificate of Correction.

It is hereby certified that in Letters Patent No. 1,575,762, granted March 9, 1926, upon the application of Charles Hoffman, of Tuckahoe, New York, and Charles N. Frey, of Warren, Ohio, for an improvement in "Preparing Yeast for Use in Food Products," errors appear in the printed specification requiring correction as follows: Page 1, line 64, for the word "least" read *yeast*, and line 91, after the word "then" insert the word *cooled;* and that the said Letters Patent should be read with these corrections therein that the same may conform to the record of the case in the Patent Office.

Signed and sealed this 13th day of April, A. D. 1926.

[SEAL.]
M. J. MOORE,
*Acting Commissioner of Patents.*